US009935443B2

(12) United States Patent
Mood et al.

(10) Patent No.: US 9,935,443 B2
(45) Date of Patent: Apr. 3, 2018

(54) CABLE GLAND

(71) Applicant: CMP PRODUCTS LIMITED, Cramlington, Northumberland (GB)

(72) Inventors: Geoffrey Ingles Mood, Whitley Bay (GB); Sam Lockey, Blyth (GB)

(73) Assignee: CMP Products Limited, Cramlington, Northumberland (GB)

( * ) Notice: Subject to any disclaimer, the term of this patent is extended or adjusted under 35 U.S.C. 154(b) by 0 days.

(21) Appl. No.: 14/901,306

(22) PCT Filed: Mar. 27, 2014

(86) PCT No.: PCT/EP2014/056228
§ 371 (c)(1),
(2) Date: Dec. 28, 2015

(87) PCT Pub. No.: WO2015/000609
PCT Pub. Date: Jan. 8, 2015

(65) Prior Publication Data
US 2016/0294173 A1 Oct. 6, 2016

(30) Foreign Application Priority Data
Jul. 2, 2013 (EP) .................................. 13174745

(51) Int. Cl.
*H01R 4/2412* (2018.01)
*H02G 3/22* (2006.01)
(Continued)

(52) U.S. Cl.
CPC ............. *H02G 3/22* (2013.01); *H01R 4/2412* (2013.01); *H01R 9/053* (2013.01);
(Continued)

(58) Field of Classification Search
USPC ........................................................ 174/70 R
See application file for complete search history.

(56) References Cited

U.S. PATENT DOCUMENTS 1,606,789 A * 11/1926 Hooley .................... H02G 3/06
123/169 PH
1,726,014 A * 8/1929 Carolan ............... H02G 15/192
174/85
(Continued)

FOREIGN PATENT DOCUMENTS

DE 1921200 A1 11/1970
DE 19849227 C1 4/2000
(Continued)

OTHER PUBLICATIONS

European Patent Office, Extended European Search Report, Application No. 13174745.3, dated Dec. 3, 2013, 5 pages.
(Continued)

*Primary Examiner* — William H Mayo, III
*Assistant Examiner* — Krystal Robinson
(74) *Attorney, Agent, or Firm* — Quarles & Brady LLP

(57) ABSTRACT

A cable gland having a first cable gland portion and a second cable gland portion in engagement with each other is disclosed. The cable gland comprises earthing members (60) in electrical engagement with the first and second gland portions, each earthing member including a spike (68) for penetrating through a sheath layer of an electrical cable, following radially inward movement of the spike, thereby forming an electrical earth connection with a conducting portion of a cable. The first gland portion comprises a first cam surface and the second gland portion comprises a second cam surface, wherein the first and second cam surfaces are adapted to engage respective earthing member cam surfaces (72, 74) of the earthing member, the first and second cam surfaces thereby causing the earthing member and the corresponding spike to move radially inwards as the first and second gland portions are brought into threaded engagement with each other.

19 Claims, 4 Drawing Sheets

(51) Int. Cl.
*H02G 15/068* (2006.01)
*H01R 9/053* (2006.01)
*H01R 4/24* (2018.01)
*H01R 4/64* (2006.01)
*H01R 4/26* (2006.01)

(52) U.S. Cl.
CPC ............ *H02G 15/068* (2013.01); *H01R 4/26* (2013.01); *H01R 4/64* (2013.01)

(56) References Cited

U.S. PATENT DOCUMENTS

| | | | | |
|---|---|---|---|---|
| 1,992,031 A * | 2/1935 | Huber | ............... | H02G 5/068 |
| | | | | 174/93 |
| 3,101,204 A * | 8/1963 | Pratley | ............... | H02G 3/0625 |
| | | | | 174/665 |
| 3,744,007 A | 7/1973 | Horak | | |
| 4,376,873 A * | 3/1983 | Lackinger | ............ | H02G 3/0616 |
| | | | | 174/653 |
| 4,379,556 A * | 4/1983 | Rundell | ............... | E21B 33/08 |
| | | | | 166/84.5 |
| 4,608,454 A * | 8/1986 | Lackinger | ............ | H02G 3/0683 |
| | | | | 174/651 |
| 5,302,779 A * | 4/1994 | Morel | ............... | H02G 15/013 |
| | | | | 174/76 |
| 5,442,140 A * | 8/1995 | McGrane | ............ | H02G 15/013 |
| | | | | 174/93 |
| 2013/0090004 A1 | 4/2013 | Corbett et al. | | |

FOREIGN PATENT DOCUMENTS

| | | | | |
|---|---|---|---|---|
| GB | 2233838 A * | 1/1991 | ........... | H02G 3/0666 |
| GB | 2300765 A | 11/1996 | | |
| WO | 01/67558 A2 | 9/2001 | | |

OTHER PUBLICATIONS

PCT International Search Report and Written Opinion, PCT/EP2014/056228, dated Aug. 25, 2014, 10 pages.
Intellectual Property Office of the United Kingdom, Examination Report, Application No. GB1522747.3, dated Sep. 7, 2017, 5 pages.

* cited by examiner

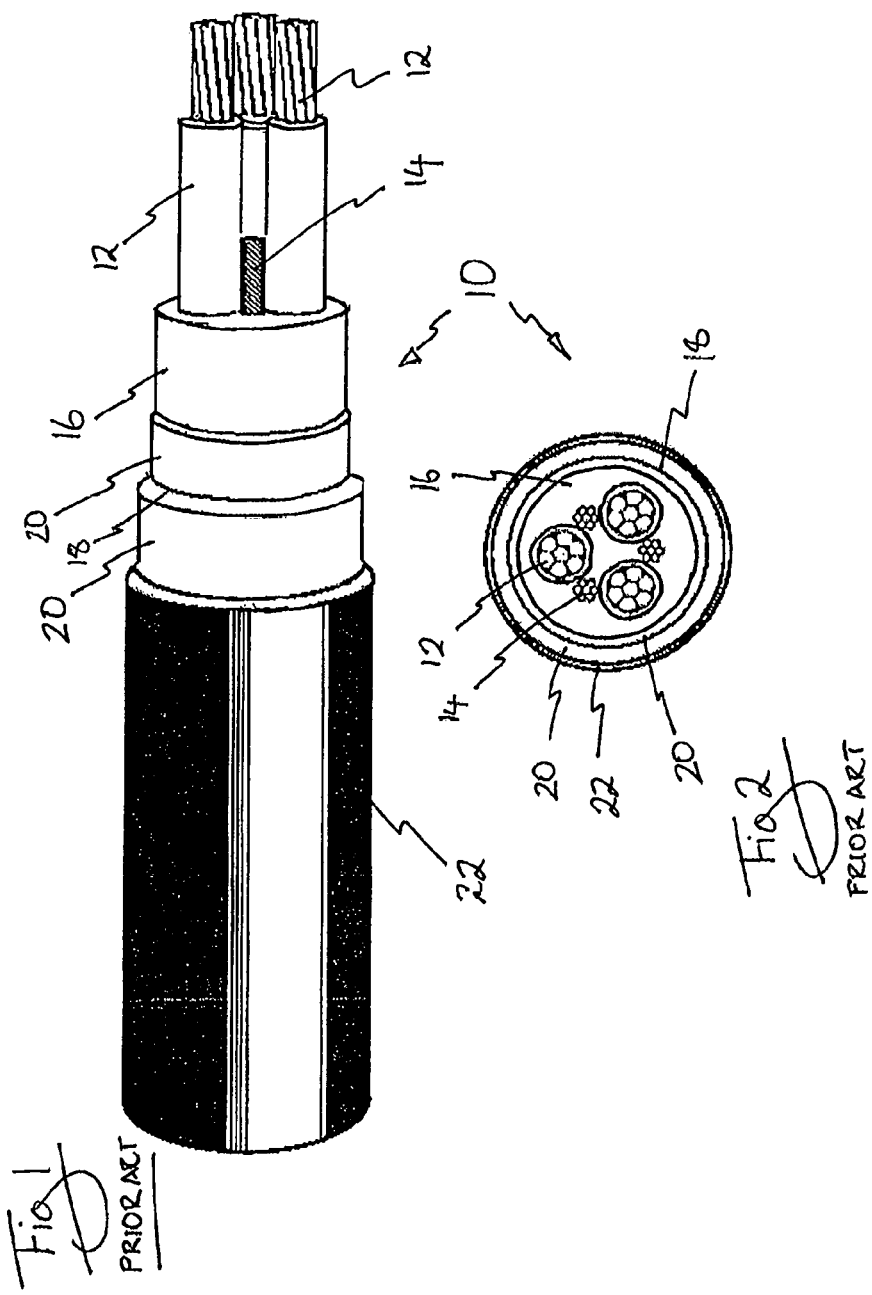

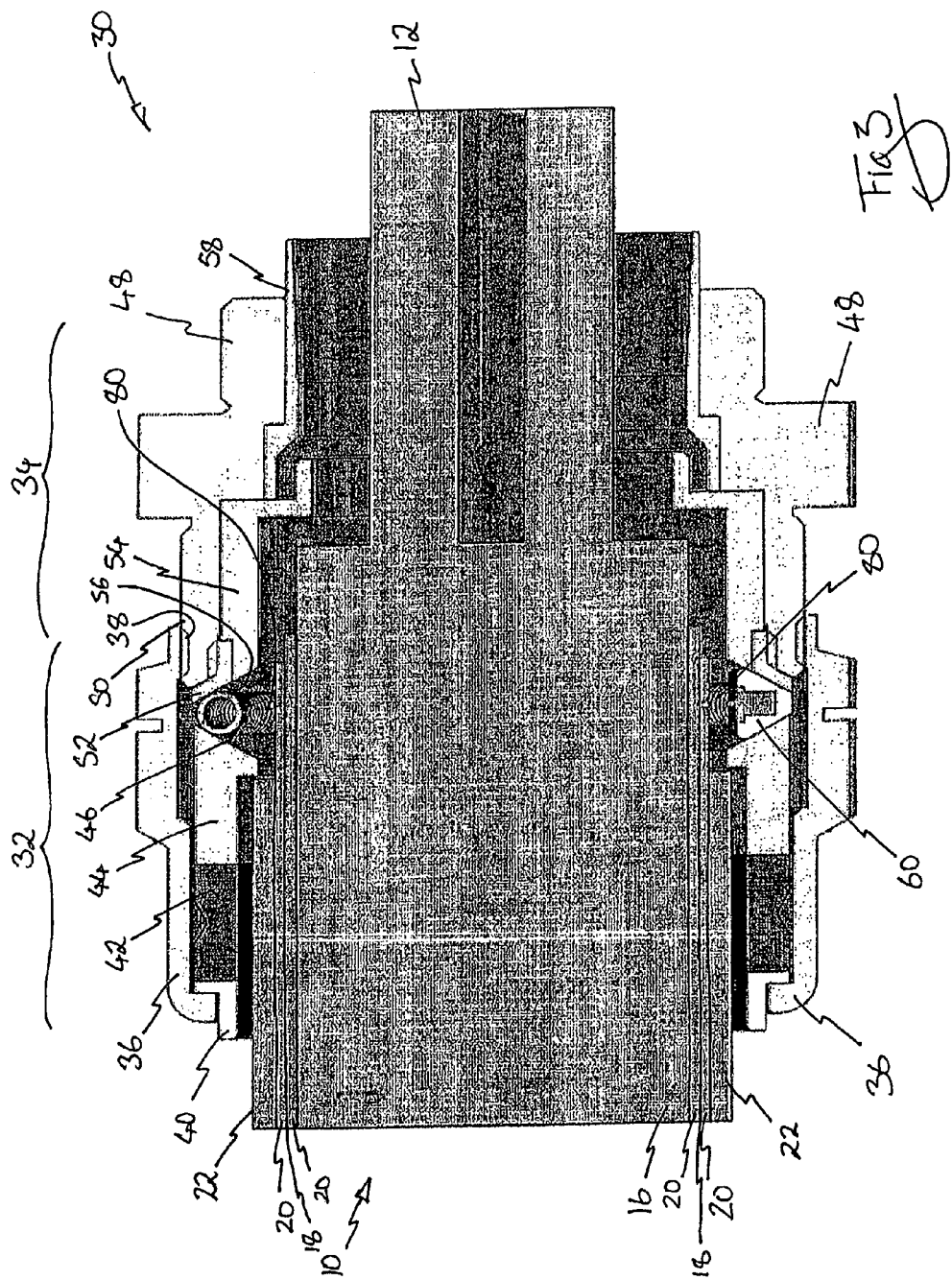

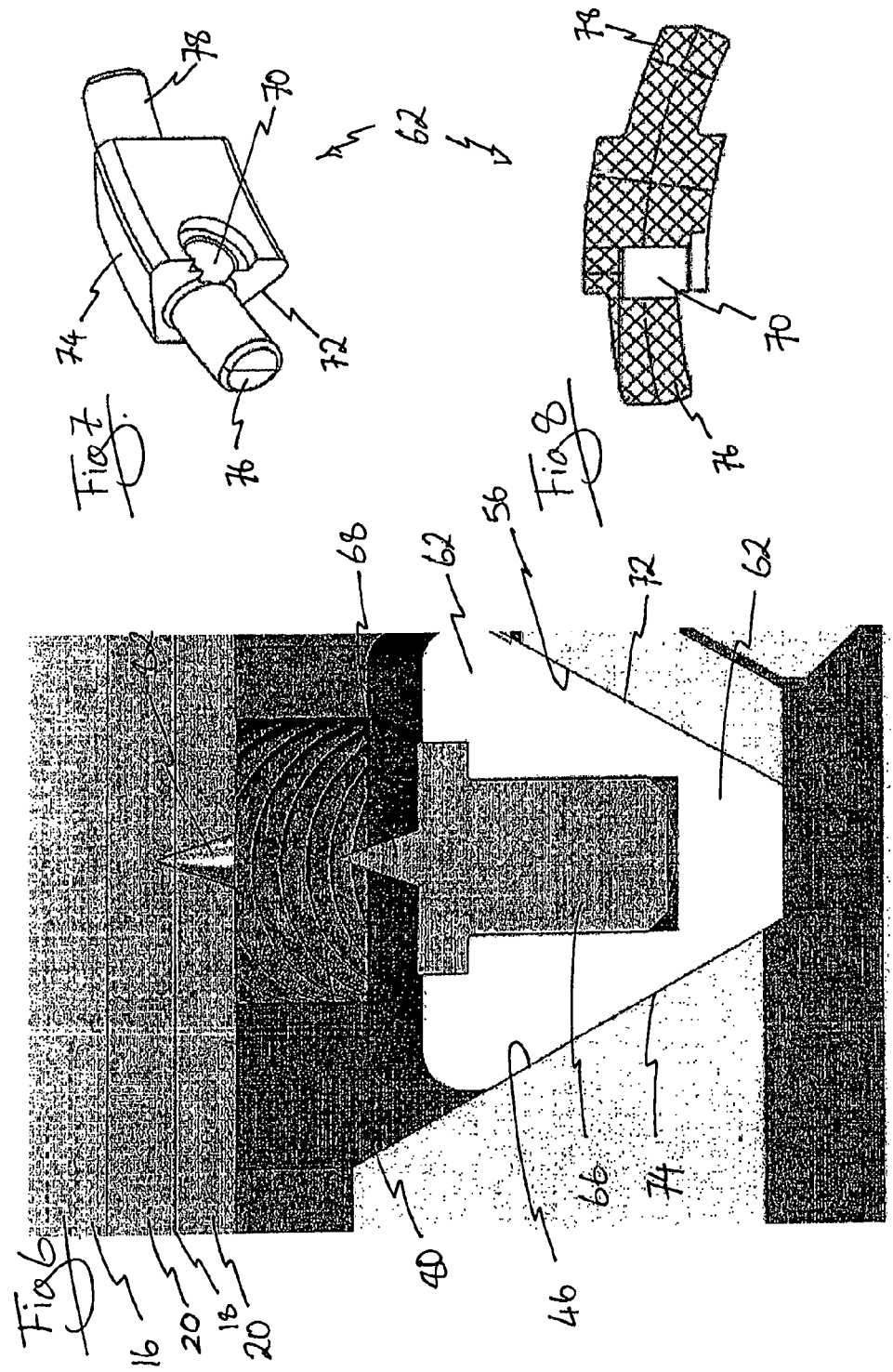

CABLE GLAND

CROSS-REFERENCE TO RELATED APPLICATIONS

This application represents the national stage entry of PCT International Application No. PCT/EP2014/056228 filed Mar. 27, 2014, which claims the benefit of European Patent Application 13174745.3 filed Jul. 2, 2013, both of which are hereby incorporated herein by reference for all purposes.

The present invention relates to a cable gland and relates particularly, but not exclusively, to an earthing device for use in a cable gland.

The use of cable glands, to seal the junction between a cable and a device or enclosure into which the cable is extending, is well known. The gland acts as a seal but also acts to grip the cable and, where appropriate, to act as an earthing connection between a shield layer of the cable and the apparatus into which the cable is extending.

An example of such a cable is shown in FIGS. 1 and 2 and these Figures illustrate a typical cable produced by Prysmian™ S.p.A. known as the Airguard™ cable. The cable 10 has three main cables 12 which are sheathed and three smaller cables 14 which are unsheathed. All six cables are embedded with in an innermost layer of foamed polymeric material 16. This is surrounded by an aluminium tape or foil shield 18 which is attached to the inside of one of a pair of nylon sheaths 20. Finally, the outer nylon sheath 20 is surrounded by an outermost PVC sheath 22. The foil shield 18 should be grounded and achieving an electrical connection to the shield can be difficult as the foil is typically adhered to the nylon sheath 20 and is thin and quite fragile. Traditional earthing techniques generally involve the exposing of foil layer. However, the fragile nature of the layer makes such techniques not feasible with this type of cable.

The gripping function of a cable gland is also important and devices of the prior art tend to apply a crushing force to the cable. Over time, this can result in damage to the layers of the cable.

GB 2300765 discloses a known electric cable termination in which threaded engagement of a gland nut with a gland body causes deformation of an earthing clip such that sharp points of fingers of the earthing clip are driven through an external sheath of a cable and into electrical contact with an underlying metallic protective layer. However, this arrangement suffers from the drawback that the need for a deformable earthing clip limits the robustness of cables with which the cable termination can be used.

Preferred embodiments of the present invention seek to overcome the above described disadvantages of the prior art.

According to a first aspect of the present invention there is provided a cable gland comprising:
at least one first cable gland portion and at least one second cable gland portion in engagement with each other; and
at least one earthing member in electrical engagement with at least one of said first and second gland portions, said earthing member including at least one sheath penetrating portion for penetrating through a sheath layer of an electrical cable following radially inward movement of at least one said sheath penetrating portion, thereby forming an electrical earth connection with a conducting portion of a cable;
wherein at least one said first gland portion comprises a respective first cam surface and at least one said second gland portion comprises a respective second cam surface, wherein said first and second cam surfaces are adapted to engage respective earthing member cam surfaces of a said earthing member, said first and second cam surfaces thereby causing said earthing member and at least one corresponding said sheath penetrating portion to move radially inwards as said first and second gland portions are brought into threaded engagement with each other.

By providing a sheath penetrating portion formed as part of an earthing member, the advantage is provided that an earthing connection can be easily and consistently made between a metallic shield layer of a cable and the cable gland. This mechanism is particularly useful where the earthing is to a layer of foil that is fragile and therefore difficult to form a reliable earthing connection with. Such a device is able to provide sufficient earth connection to produce a low current earth connection that is typically required from a foil shield. However, the same apparatus can also provide a higher current earth where a shield is formed from braided or woven wire. Furthermore, the sheath penetrating portions act to grip and anchor the cable in the gland meaning that the gland will withstand the toughest of pull tests. In addition, by providing first and second cam surfaces adapted to engage respective earthing member cam surfaces of an earthing member, the first and second cam surfaces thereby causing the earthing member and at least one corresponding sheath penetrating portion to move radially inwards as the first and second gland portions are brought into threaded engagement with each other, this provides the advantage of enabling the earthing member to be made from rigid material. This in turn enables the earthing member to be used on more robust cables, and thereby enables more reliable and consistent cable connections to be achieved.

In a preferred embodiment at least one penetrating portion comprises at least one spike.

By using one or more spikes, the advantage is provided that a good earthing connection can be provided with a foil shield and a cable.

In another preferred embodiment at least one penetrating portion comprises at least one blade.

By providing one or more blades, the advantage is provided that the area of contact between the penetrating portion and the shield is increased, thereby improving the earthing connection to the shield in a cable.

The gland may further comprise biasing means for biasing the or each earthing member in a radially outward direction.

By providing biasing means to move the earthing members in a radially outward direction, the advantages provided that the earthing members and spikes or blades are kept out of the way of the cable as it is inserted through the gland. Furthermore, the earthing member is maintained in electrical connection with the surfaces of the first and second cable gland portions by ensuring that it engages their surfaces at all times.

In a preferred embodiment the biasing means is electrically conducting.

In another preferred embodiment the biasing means comprises a spring.

By using a spring that is electrically conducting, the advantage is provided that an electrical connection is provided between all of the earthing members ensuring the maximum electrical connection is maintained between all components.

In a preferred embodiment the or each said biasing member and the or each earthing member are arranged annularly.

By arranging the biasing members annularly the advantage is provided that the biasing members compensate for any movement of the earthing members as they move radially inward ensuring that the sheath penetrating portions only move in a radially inward directly. As a result, the sheath penetrating portions penetrate the sheath in a straight line without risking any circumferential movement which can damage the shield (particularly if it is a foil shield) by tearing.

At least one said earthing member may include a respective penetration limiting portion for limiting penetration of the corresponding said sheath penetrating portion through a sheath layer of an electrical cable.

This provides the advantage of reducing the risk of damage to the cable.

At least one said penetration limiting portion may be adapted to abut the sheath layer of the electrical cable.

At least one said penetration limiting portion may comprise a flange.

According to another aspect of the present invention there is provided a cable gland comprising:

at least one first cable gland portion and at least one second cable gland portion in engagement with each other;

a plurality of gripping members including at least one respective sheath penetrating portion for penetrating a sheath layer of an electrical cable following radially inward movement of a plurality of said sheath penetrating portions; and biasing means for biasing a plurality of said penetrating portions radially outwards;

wherein said biasing means comprises a plurality of biasing members located between respective pairs of said gripping members and said biasing members and said gripping members are arranged annularly.

By providing gripping members and biasing members that are arranged annularly, the advantage is provided that the gripping members can partially penetrate the sheath of a cable and provide excellent gripping to that cable. The length of the sheath penetrating portion can be carefully controlled so as to ensure that the penetrating portion does not extent too far into the sheath and risk damaging the cables whilst at the same time the pressure applied by the cable gland on the cable can be reduced compared to gripping mechanisms that rely on a crushing force being applied to the cable. As a result, less robust cables can be effectively gripped without danger of crush damage occurring to the cable.

At least one said gripping member may include a respective penetration limiting portion for limiting penetration of the corresponding said sheath penetrating portion through a sheath layer of an electrical cable.

This provides the advantage of reducing the risk of damage to the cable.

At least one said penetration limiting portion may be adapted to abut the sheath layer of the electrical cable.

At least one said penetration limiting portion may comprise a flange.

In a preferred embodiment at least one penetrating portion comprises at least one spike.

In another preferred embodiment at least one penetrating portion comprises at least one blade.

In a further preferred embodiment the biasing means is electrically conducting.

In a preferred embodiment the biasing means comprises at least one spring.

In another preferred embodiment at least one of said first and, second gland portions comprise a cam surface for engaging at least one respective cam surface of said gripping member, said cam surfaces thereby causing said gripping member and at least one said sheath penetrating portion to move radially inwards as said first and second gland portions are brought into threaded engagement with each other.

At least one said first cable gland portion may comprise a respective first cam surface and at least one said second cable gland portion may comprise a respective second cam surface, wherein said first and second cam surfaces are adapted to engage respective gripping member cam surfaces of a said gripping member, said first and second cam surfaces thereby causing said gripping member and at least one corresponding said sheath penetrating portion to move radially inwards as said first and second cable gland portions are brought into threaded engagement with each other.

This provides the advantage of enabling the gripping member to be made from rigid material. This in turn enables the gripping member to be used on more robust cables, and thereby enables more reliable and consistent cable connections to be achieved.

Preferred embodiments of the present invention will now be described, by way of example, and not in any limitative sense, with reference to the accompanying drawings, in which:

FIG. 1 is a perspective view of a portion of a cable of the prior art;

FIG. 2 is an end view of a cable of FIG. 1;

FIG. 3 is a sectional view of a cable gland of the present invention;

FIG. 6 is a close-up view of part of the cable gland of FIG. 3; and

FIGS. 7 and 8 are perspective and sectional views of a component of the present invention.

Figure 4:
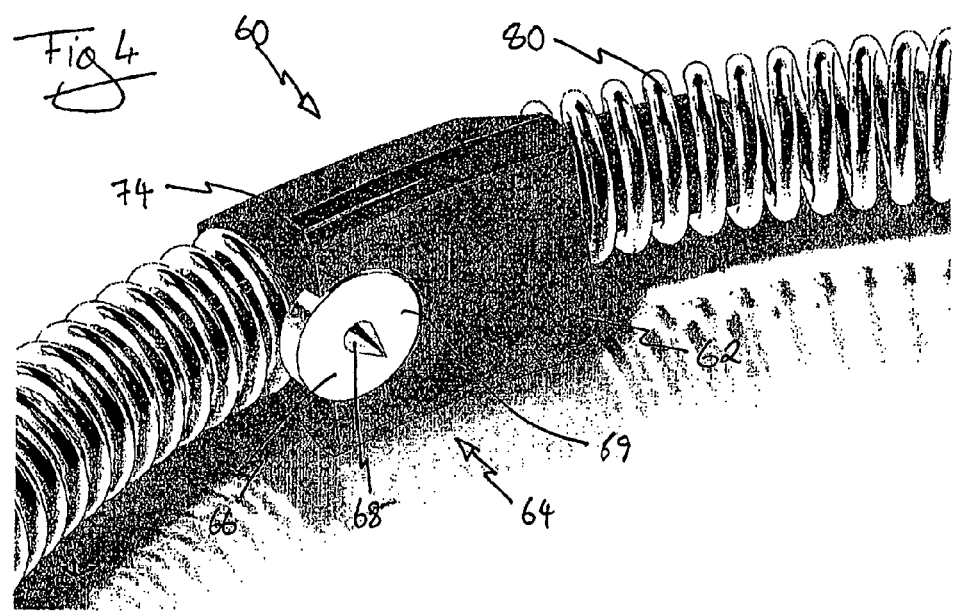
FIGS. 4 and 5 are perspective and sectional perspective views of a portion of the present invention.

Referring to FIGS. 3 to 8, a cable gland 30 has a first cable gland portion, indicated generally at 32 and a second cable gland portion indicated generally at 34. The first and second gland portions are formed from a number of components and the main component of the first cable gland portion 32 is the outer nut 36 which has an internal threaded portion 38. Other components included within the first cable gland portion are ferrule 40 which is typically formed from a plastic material. Seal 42 engages ferrule 40 and also engages a spacer 44. Under compression the seal 42 deforms radially inwards and engages the outermost sheath 22 of cable 10. Spacer 44 has a first cam surface 46.

The second cable gland portion 34 has a main component in the form of body 48 that has an external thread 50 which engages internal thread 38 of outer nut 36. Also included within second cable gland portion 34 are armour spacer 52 and tube spacer 54 which together form a second cam surface 56. Also forming part of the second cable gland portion 34, in this example of a cable gland, is a compound tube 58. In the embodiment shown the outer nut 36 and body 48 engage each other with respective threaded portions 38 and 50. However, other means, familiar to those skilled in the art, may be used to engage the nut and body of the gland.

Gland 30 also includes at least one, and in the example shown three, earthing members 60. Either or both of the first and second gland portions 32 and 34 are in electrical engagement with the earthing member 60. In the embodiment shown, it can be seen that earthing member 60 is in engagement with the first and second cam surfaces 46 and 56. As a result, if spacer 44 is formed from an electrically conductive material there is an electrical connection between the earthing member 60 and outer nut 36 via spacer 44. Similarly, an electrical connection can exist between the earthing member 60 and either or both of the armour spacer 52 and tube spacer 54 through to the body 48.

Referring particularly to FIGS. 4 to 8, the earthing member 60 is formed from two components, namely a wedge body 62 and a cable engaging portion 64. The cable engaging portion 64 can itself be divided into two separate portions, namely a body 66 and a sheath penetrating portion or spike 68. The cable engaging portion 64 is formed as a single component that engages an aperture 70 in wedge body 62. The wedge body 62 has cam surfaces 72 and 74 and arms 76 and 78. The cable engaging portion 64 has a penetration limiting portion in the form of a flange 69 surrounding the spike 68 and adapted to abut a sheath of a cable to limit the extent of penetration of the spike 68 into the cable.

The cable gland 30 also has at least one, and in the example shown 3, biasing means in the form of springs 80. The cable gland preferably has one spring 80 for each earthing member 60 and the arms 76 and 78 of wedge body 62 extend into the open ends of the springs 80. As a result, the combination of springs 80 and earthing members 60 form an annulus that sits within the channel formed between the first and second cam surfaces 46 and 56.

Figure 5:
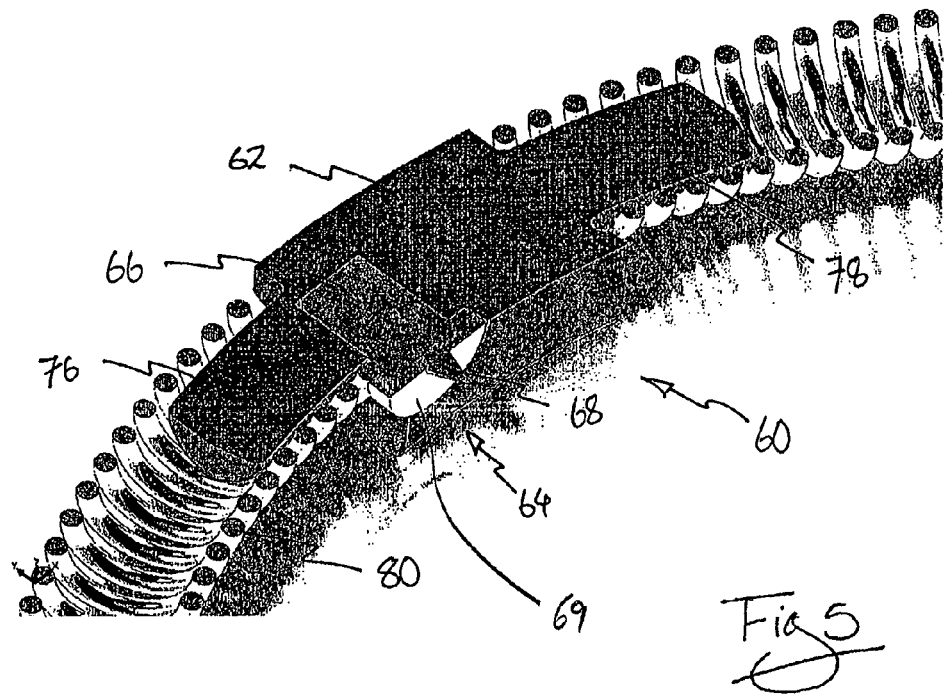

With particular reference to FIG. 5, in the embodiment shown the metal cable engaging portion 64 touches the metal spring 80, which in turn touches the surfaces 46 and 56 of gland body portions 32 and 24. In this embodiment, the wedge body 62 can be formed from a non-conductive material such as a moulded plastic. In an alternative embodiment, the wedge body is made from an electrically conducting material. It should also be noted that the wedge body 62 and cable engaging portion 64 of earthing member 60 could be formed as a single component.

The operation of cable gland 30 will now be described. Cable 10 is prepared by removing some of the sheathing layers, approximately as shown in FIG. 3. The cable is separated into three sections along its length at the end that extends into the cable gland 30. An outermost section, remains external to the component, into which the gland 30 extends, and on this section the outermost sheath 22 remains. On the innermost end, the sheathing layers 22, 20, 18 and 16 are removed leaving only the individual cores which extend into the component which gland 30 seals. In an intermediate section of cable 10, the outermost sheath is removed but the inner layers of sheathing 20, 18 and 16 remain. Spacers 44, and 54, along with ferrule 40 and seal 42, can be interchanged within cable gland 30 to accommodate different diameters of cable with the size of the aperture that extends through these components being selected dependent upon the diameter of the cable.

Once the components of cable gland 30 are assembled around the cable 10, as shown in FIG. 3, the outer nut 36 is tightened onto body 48 by the mutual engagement of internal thread 38 and external thread 50. As the outer nut 36 and body 48 move towards each other the cam surfaces 72 and 74 of earthing member 60 engage the first and second cam surfaces 46 and 56 which results in the radially inward movement of the earthing members 60. Cable 10 is positioned such that the exposed sheath 20 is engaged by earthing members 60 and the spike 68 is pushed into and through the outer nylon sheath 20 so that spike 68 comes into engagement with foil layer 18. In FIG. 6 the hole formed by spike 68 can be seen, as indicated at 82. As seen in FIG. 6 the spike 68 may extend partially into foil layer 18 thereby forming an electrical connection between the foil and the spike and in turn the other components of cable gland 30. Alternatively, the spike 68 may be sized to extend through the foil layer and partially into inner sheath 16 but will still form the earthing connection between the foil layer 18 and earthing member 60. The spike 68 is sized to penetrate to the correct depth for the cable in question, ensuring it extends into the shield layer but not extending too far into the cable. However, one size of spike 68 will be suitable for many different cables. In addition, the extent of penetration of the spike 68 into the sheath 20 is limited by abutment of the flange 69 against the sheath 20.

In an alternative embodiment, the earthing member 60 may simply act as a gripping member and not form an electrical connection between a metal shield layer in a cable and the cable gland 30. In this instance, all or part, of the earthing member 60 as well as the springs 80 or other biasing means, may be formed from electrically insulating materials. As a result, the earthing members 60 (more correctly in this instance termed gripping members 60) simply assist in anchoring the cable 10 within gland 30 without the need to apply a significant compressing and crushing force to cable 10.

In the embodiments shown in FIG. 3, the compound tube 58 is included to receive a sealing compound which is installed into the space between tube 58 and cable 10. The earthing or gripping members 60 described above would also work in other types of cable gland.

It will be appreciated by persons skilled in the art that the above embodiments have been described by way of example only and not in any limitative sense, and that various alterations and modifications are possible without departure from the scope of the invention as defined by the appended claims. For example, the invention can be used in a cable gland design for use with a cable that includes a shield layer formed from braided or woven metal wire. In such an example the spike 68 pushes between strands of the wire and is therefore pressed into engagement with the wire providing the electrical connection required to earth the shield of the cable. As a result the gland of the present invention is suitable for use with almost any cable. In a further alternative, the earthing member 60 can be provided with multiple spikes 68 and the spike 68 may be replaced with one or more blade devices that operate in the same manner by extending through the sheath layer 20 and into the metal shield 18 whether it is foil or braided or woven wire.

The invention claimed is:

1. A cable gland comprising:
   at least one first cable gland portion and at least one second cable gland portion in engagement with each other; and
   at least one earthing member in electrical engagement with at least one of said first and second gland portions, said earthing member including at least one sheath penetrating portion for penetrating through a sheath layer of an electrical cable, following radially inward movement of at least one said sheath penetrating portion, thereby forming an electrical earth connection with a conducting portion of a cable located radially inwards of the sheath layer;
   wherein at least one said first gland portion comprises a respective first cam surface and at least one said second gland portion comprises a respective second cam surface, wherein said first and second cam surfaces are adapted to engage respective earthing member cam surfaces of a said earthing member, said first and second cam surfaces thereby causing said earthing member and at least one corresponding said sheath penetrating portion to move radially inwards as said first and second gland portions are brought into threaded engagement with each other;

and the cable gland further comprises at least one biasing device for biasing the or each earthing member in a radially outward direction.

2. A cable gland according to claim 1, wherein at least one penetrating portion comprises at least one spike.

3. A cable gland according to claim 1, wherein at least one penetrating portion comprises at least one blade.

4. A cable gland according to claim 1, wherein at least one said biasing device is electrically conducting.

5. A cable gland according to claim 1, wherein at least one said biasing device comprises a spring.

6. A cable gland according to claim 1, wherein the or each said biasing device and the or each earthing member are arranged annularly.

7. A cable gland comprising:
at least one first cable gland portion and at least one second cable gland portion in engagement with each other; and
at least one earthing member in electrical engagement with at least one of said first and second gland portions, said earthing member including at least one sheath penetrating portion for penetrating through a sheath layer of an electrical cable, following radially inward movement of at least one said sheath penetrating portion, thereby forming an electrical earth connection with a conducting portion of a cable located radially inwards of the sheath layer;
wherein at least one said first gland portion comprises a respective first cam surface and at least one said second gland portion comprises a respective second cam surface, wherein said first and second cam surfaces are adapted to engage respective earthing member cam surfaces of a said earthing member, said first and second cam surfaces thereby causing said earthing member and at least one corresponding said sheath penetrating portion to move radially inwards as said first and second gland portions are brought into threaded engagement with each other; and
at least one said earthing member includes a respective penetration limiting portion for limiting penetration of the corresponding said sheath penetrating portion through a sheath layer of an electrical cable.

8. A cable gland according to claim 7, wherein at least one said penetration limiting portion is adapted to abut the sheath layer of the electrical cable.

9. A cable gland according to claim 8, wherein at least one said penetration limiting portion comprises a flange.

10. A cable gland comprising:
at least one first cable gland portion and at least one second cable gland portion in engagement with each other;
a plurality of gripping members including at least one respective sheath penetrating portion for penetrating a sheath layer of an electrical cable following radially inward movement of a plurality of said sheath penetrating portions, thereby forming an electrical earth connection with a conducting portion of a cable located radially inwards of the sheath layer; and
at least one biasing device comprising a plurality of biasing members located between respective pairs of said gripping members for biasing said gripping members apart, and said biasing members and said gripping members are arranged annularly.

11. A cable gland according to claim 10, wherein at least one said gripping member includes a respective penetration limiting portion for limiting penetration of the corresponding said sheath penetrating portion through a sheath layer of an electrical cable.

12. A cable gland according to claim 11, wherein at least one said penetration limiting portion is adapted to abut the sheath layer of the electrical cable.

13. A cable gland according to claim 12, wherein at least one said penetration limiting portion comprises a flange.

14. A cable gland according to claim 10, wherein at least one penetrating portion comprises at least one spike.

15. A cable gland according to claim 10, wherein at least one penetrating portion comprises at least one blade.

16. A cable gland according to claim 10, wherein at least one said biasing device is electrically conducting.

17. A cable gland according to claim 10, wherein at least one said biasing device comprises at least one spring.

18. A cable gland according to claim 10, wherein at least one of said first and second gland portions comprise a cam surface for engaging at least one respective cam surface of said gripping member, said cam surfaces thereby causing said gripping member and at least one said sheath penetrating portion to move radially inwards as said first and second gland portions are brought into threaded engagement with each other.

19. A cable gland according to claim 18, wherein at least one said first cable gland portion comprises a respective first cam surface and at least one said second cable gland portion comprises a respective second cam surface, wherein said first and second cam surfaces are adapted to engage respective gripping member cam surfaces of a said gripping member, said first and second cam surfaces thereby causing said gripping member and at least one corresponding said sheath penetrating portion to move radially inwards as said first and second cable gland portions are brought into threaded engagement with each other.

* * * * *

UNITED STATES PATENT AND TRADEMARK OFFICE
CERTIFICATE OF CORRECTION

PATENT NO. : 9,935,443 B2
APPLICATION NO. : 14/901306
DATED : April 3, 2018
INVENTOR(S) : Geoffrey Ingles Mood et al.

It is certified that error appears in the above-identified patent and that said Letters Patent is hereby corrected as shown below:

In the Specification

Column 5, Line 43, "44, and 54" should be --44, 52 and 54--.

Signed and Sealed this
Nineteenth Day of June, 2018

Andrei Iancu
*Director of the United States Patent and Trademark Office*